United States Patent [19] [11] 3,895,244
Link [45] July 15, 1975

[54] ENCAPSULATED ELECTROMAGNETIC GENERATOR
[75] Inventor: William T. Link, Berkeley, Calif.
[73] Assignee: Norse Systems, Incorporated, Hayward, Calif.
[22] Filed: Dec. 28, 1973
[21] Appl. No.: 429,641

[52] U.S. Cl. .................................. 310/15; 310/36
[51] Int. Cl. .......................................... H02k 35/00
[58] Field of Search ............ 310/15, 30, 29, 36, 38, 310/77

[56] References Cited
UNITED STATES PATENTS
| 2,617,851 | 11/1952 | Bisch | 310/36 X |
| 2,784,327 | 3/1957 | Drescher | 310/36 |
| 3,259,769 | 7/1966 | Stott | 310/15 |
| 3,348,080 | 10/1967 | Lair | 310/36 X |
| 3,389,277 | 6/1968 | Fiore | 310/77 |
| 3,582,695 | 6/1971 | Wannamaker | 310/36 X |

Primary Examiner—Donovan F. Duggan
Attorney, Agent, or Firm—Phillips, Moore, Weissenberger Lempio & Strabala

[57] ABSTRACT

The invention comprises a generator adapted for short armature stroke operation including a stator surrounding an armature, the armature having coils about it in the usual manner and a magnet. The stator has two opposed surfaces of opposite polarity. The armature is propelled through a short stroke from contact with one of the surfaces to contact with the other. Whenever the armature is in contact with one of the surfaces the magnetic field in the armature-stator combination has a complete ferromagnetic path to pass through. The armature stator travels in substantially a straight line. As the armature passes from contact with one to the other of the surface of the stator, the flux through the armature reverses in direction, thereby providing large power gain. The generator can be encapsulated in a flexible jacket for protection from corrosive liquids. A dash dot system can be included so that the generator may accommodate to large semi-steady changes in the forces acting on it.

7 Claims, 11 Drawing Figures

ENCAPSULATED ELECTROMAGNETIC GENERATOR

BACKGROUND OF THE INVENTION

The generation of electric power by movement of an armature in a magnetic field is old in the art. Rotating armature generators are widely used to provide both alternating current and direct current power. Linear armature motion generators can also be used for producing power. In either case the magnetic field within which the armature is moved may be provided by a permanent magnet or by an electromagnet which may be driven by the electricity produced by the movement of the armature. It is of course necessary to provide an external force to move the armature.

The power derived from an armature is well known to be proportional to $(\Delta\phi/\Delta t)^2$. Hence, a generator of the type in which the armature flux is reversed is especially useful when the flux within the armature changes directions as the armature contacts one and then the other of the surfaces of the stator, thereby providing a change in flux from $+\phi$ to $-\phi$ or a total of $2\phi$ for a power output of four times that obtainable when the flux simply goes from $\phi$ to $O$.

A generator useful for implantation within a living body wherein the power from the generator can be used to run a cardiac pacemaker, actuate sphincter muscles, control the phrenic nerve, control drop foot or the like or provide power for operating a transmitter which transmits information on bodily functions to a medical monitoring station should be small, rugged provide relatively high power and operate responsive to the prevalent linear forces acting in the body. For such uses encapsulation of the generator is also very desirable. It is also desirable if the generator is responsive to fluctuating forces and self-correcting to cancel out semi-steady state forces. The present invention provides just such a generator.

SUMMARY OF THE INVENTION

The invention comprises a generator adapted for short armature stroke operation. The generator comprises a first ferromagnetic member having spaced apart surfaces and a second ferromagnetic member having a portion thereof adapted to contact one or the other of the surfaces and having another portion thereof magnetically coupled with the first member to present a complete ferromagnetic return path to the first member. Means are provided to induce a magnetic field in one of the ferromagnetic members whereby when relative motion is effected between the members such that the second member contacts one and then the other of the surfaces, change in magnetic flux is generated in the other of the members due to relative motion between the members such that the second member contacts one and then the other of the surfaces. The changing flux can be used to generate an electric current.

The contact surfaces preferably are in opposed juxtapositioned relationship with the relative motion between the members being restricted so that the portion of the second member adapted to contact one or the other of the surfaces travels a substantially linear path. In the preferred embodiments the first member comprises the stator and the second member comprises the armature with the field-including means being a magnet which serves to induce a magnetic field in the stator which can be detected by a coil about the armature.

BRIEF DESCRIPTION OF THE DRAWING

The invention will be better understood by reference to the drawing wherein like numbers denote like parts throughout and wherein.

DESCRIPTION OF THE PREFERRED EMBODIMENT

Figure 2:
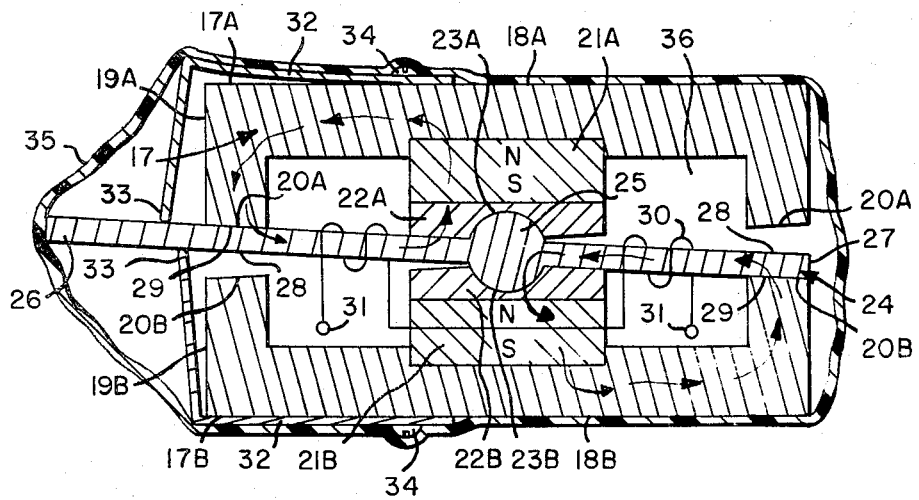
FIG. 2 illustrates the embodiment of FIG. 1 in crossection.
Figure 1:
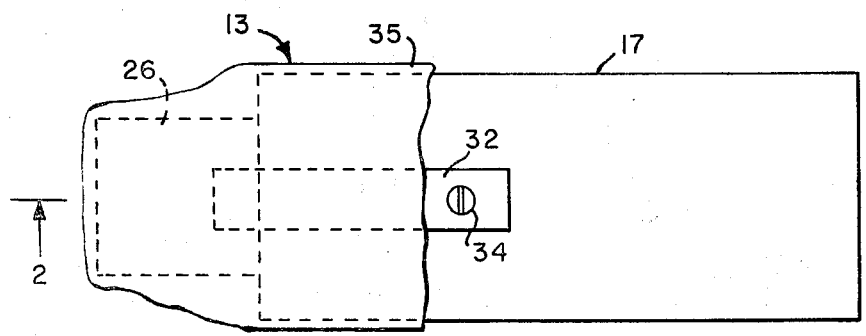
FIG. 1 illustrates one embodiment of the invention, partially cut away.

In FIG. 1 is illustrated a rocking armature generator of the subject invention designated generally by the numeral 13. A first ferromagnetic member, comprising a stator 17 is illustrated in most detail in FIG. 2. The stator includes two symmetrical bridges 17A and 17B. The bridges include cross members 18A and 18B and legs 19A and 19B respectively. The legs of the bridges end at faces 20A and 20B, the faces being in spaced apart opposed juxtapositioned relationship. Attached centrally to the cross members in opposed relationship to one another are magnets 21A and 21B. Attached to the magnets opposite the cross members are the spacer portions 22A and 22B of the stator. The spacer portions include opposed grooves 23A and 23B for purposes which will be apparent from the description which follows. The magnets are so arranged relative to one another that the faces are of opposite polarity.

A cooperating second ferromagnetic member comprising a rocking armature 24 is held within the opposed grooves 23A and 23B by the clamping of the mid-portion 25 of the armature in a manner to permit pivotal motion. The armature has an accessible end portion 26 and a non-accessible end portion 27. The accessible end portion serves as means to effect relative motion between the stator 17 and the armature whereby the portions 28 and 29 of the armature contact one and then another of the faces 20A and 20B of the stator. It is, of course, possible to make both of the end portions of the armature accessible. The faces are cut at an angle into the legs 19A and 19B so that the portions of the armature which contact them will contact them so as to form a flat mating fit.

A coil 30, shown roundabout the armature 24 serves as a means to extract current from the armature. Current generated within the coil is available at the contact points 31.

A biasing means, in this case the metallic spring metal strips 32, is provided which tends to partially overcome the force holding the armature 24 in either of its two magnetically stable positions. When the armature is in either one of its two magnetically stable positions an end 33 of one of the metallic strips tends to push against the armature to force it away from said one stable position and toward its other stable position. The metal strips as illustrated are held in place by metal screws 34.

The rocking armature generator 13 is preferably encapsulated in a flexible jacket 35 which can be, for example, a plastic material. The open portions within the rocking armature generator can be filled with an inert liquid 36 whereby pressure can be equalized between the encapsulated interior of the generator and an external environment. The flexible jacket is useful in keeping corrosive liquids from entering the generator and interfering with or stopping its operation. The jacket is sufficiently flexible to allow movement of the armature 24 responsive to forces applied through the jacket at the accessible end portion 26 of the armature.

Figure 3A:
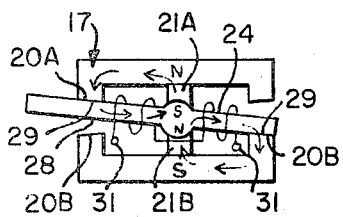
FIGS. 3A, 3B and 3C are views similar to FIG. 2 showing the armature in various positions of operation.
Figure 3B:
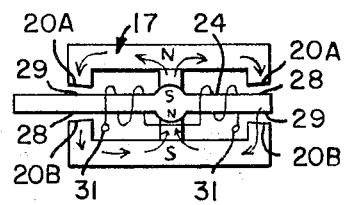
Figure 3C:
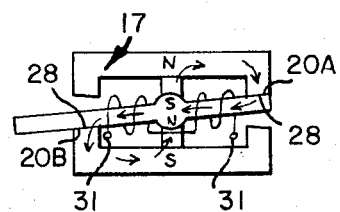

By reference now to FIGS. 3A, 3B and 3C, the direction of flux through the armature 24 and the stator 17 will be clear for each of the stable positions of the armature. In FIG. 3A the portion 29 of the armature on the lefthand side of the figure is contacting face 20A of the stator and the portion of the armature on the righthand side of the figure is contacting face 20B of the stator. In this stable position or more correctly, as the armature is thrown into this stable position as from the intermediate position illustrated in FIG. 3B, the flux through the armature 24 will flow from left to right as shown by the arrows. Referring now to FIG. 3C, it is clear that the portion 28 of the armature is in contact with face 20B of the stator on the lefthand side of the figure and with face 20A of the stator on the righthand side of the figure. As the armature attains this stable position flux will be seen to flow from the right to the left as shown by the arrows. Thus the direction of flux is reversed substantially 180° whereby the power output at the contact points 31 is four times that which would occur if the flux simply went from the value shown for example in FIG. 3A to zero.

It is also apparent from examination of FIGS. 3A and 3C and in particular of the arrows shown therein that in each of the stable positions of the armature 24 there are complete ferromagnetic return paths through the stator 17, each of the magnets 21A and 21B respectively and the armature 24. Thus it is possible to operate with a relatively small gap between the armature and the non-contacted surface of the stator. For example, if one looks at the lefthand side of FIG. 3A, it is clear that there can be a quite small gap between the portion 28 of the armature and the face 20B of the stator. This is because the magnet 21B has available to it a complete ferromagnetic path as in the righthand portion of FIG. 3A. This allows relatively short armature stroke, small-gap operation of the generator which is a decided advantage when a relatively small generator is desired as for insertion within a living body. The fact that the flux is reversed in the embodiment shown allows relatively high power to be obtained from the relatively short armature stroke generator whereby enough power can be generated to run considerable medical equipment such as a cardiac pacemaker.

Figure 4:
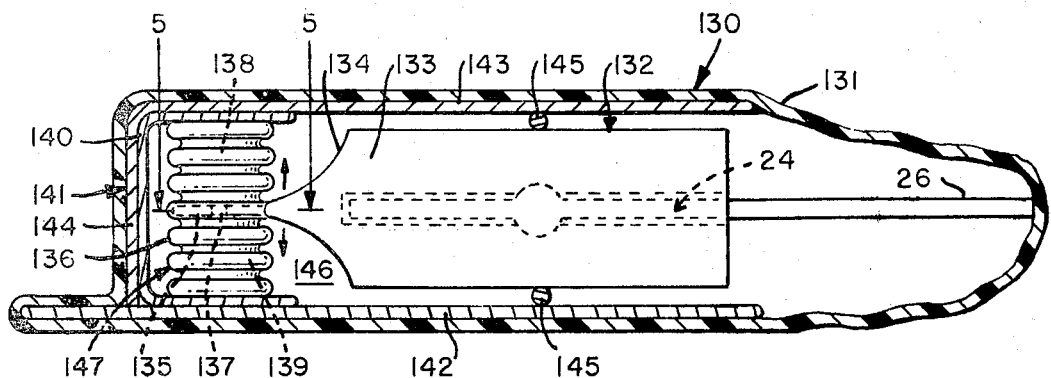
FIG. 4 illustrates in cross-section an embodiment of the invention similar to that illustrated in FIGS. 1, 2 and 3 but including a dash pot.
Figure 5:
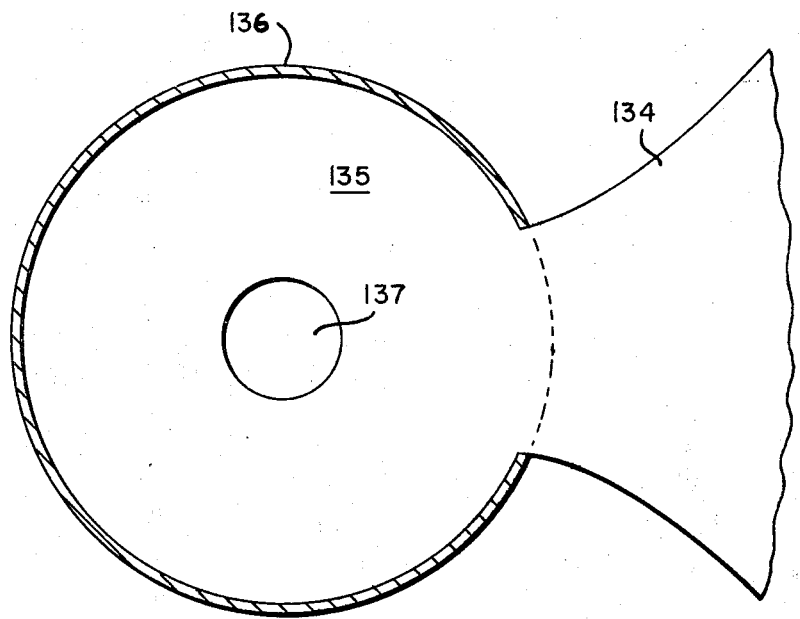
FIG. 5 illustrates a blownup view taken along line 5—5 of FIG. 4.

Referring now to FIGS. 4 and 5, there is illustrated an embodiment of the invention wherein an encapsulated rocking armature generator is provided which includes means for self-correcting the generator to accommodate for large semi-steady changes in the forces acting thereon. The electromagnetic generator 130 includes the flexible jacket 131 about the electromagnet portion 132 of the generator. The electromagnetic portion of the generator is internally identical to the embodiment illustrated in FIG. 2.

In the embodiment illustrated in FIGS. 4 and 5, the accessible end portion 26 of the armature 24 is somewhat longer to provide easier access thereto. Also, the end 133 of the electromagnetic portion 132 furthest from the accessible end portion of the armature has attached thereto a shank 134, the shank having attached thereto a ring 135, the ring being in a plane perpendicular to the motion of the armature. The ring forms a separating partition within the oil-filled bellows 136. The opening 137 at the center of the ring is made relatively small so that oil can flow only slowly from one chamber 138 of the bellows to the other chamber 139 thereof.

The bellows 136 is held rigidly by the U-shaped member 140 which is in turn held by the L-shaped member 141 and the plate 142. The plate and the longer leg 143 of the L-shaped member each extend substantially parallel to the armature 24. The shorter leg 144 of the L-shaped member is perpendicularly attached to the plate as illustrated. The electromagnetic portion 132 of the encapsulated generator 130 is pivotally held between the plate and the longer leg of the L-shaped member. In the embodiment illustrated in FIGS. 4 and 5, this is accomplished by the two round rods 145. The voids within the flexible jacket 131 are generally filled with an inert liquid 146 for the pressure equalizing reasons previously mentioned.

The bellows 136 in combination with the L-shaped member 141 and the ring 135 forms a dash pot 147 which permits the electromagnetic generator 130 to self-adjust and accommodate for large semi-steady changes in the forces acting upon it. For example, a relatively large steady force may be exerted upon the accessible end 26 of the armature 24. This could happen if the encapsulated generator was implanted in a human being and the human being decided to lie down in bed thereby causing external forces from the bed to be constantly applied to the accessible end of the armature. These forces might last all night long while the human being slept. If a force was exerted in such a manner to the accessible end of the armature, the armature would initially become jammed into one of its two magnetically stable positions. In the embodiment shown, oil would then begin leaking through the opening 137 from one of the chambers 138 or 139 to the other chamber. This would continue until the resultant steady force had been completely balanced out and the generator had been rotated sufficiently to free it from the influence of the large semi-steady change in the force acting on it; that is, to free itself from the forces resulting from the human being lying down. The interruption of power production from the generator would be for only a short period of time. Thereafter, the generator would again operate having self-corrected itself or the semi-steady force acting on it. Clearly the ability to self-adjust to accommodate large semi-steady changes in the forces acting on the generator is very important to a generator which is implanted in a living subject.

Figure 7:
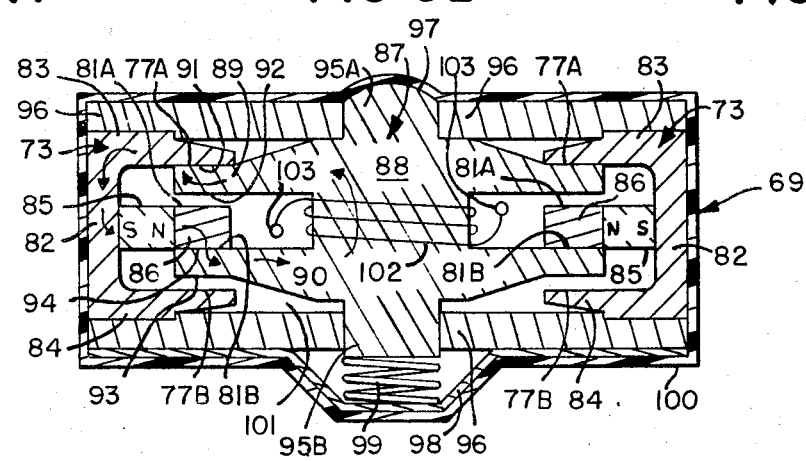
FIG. 7 illustrates the embodiment of FIG. 6 in crosssection.
Figure 6:
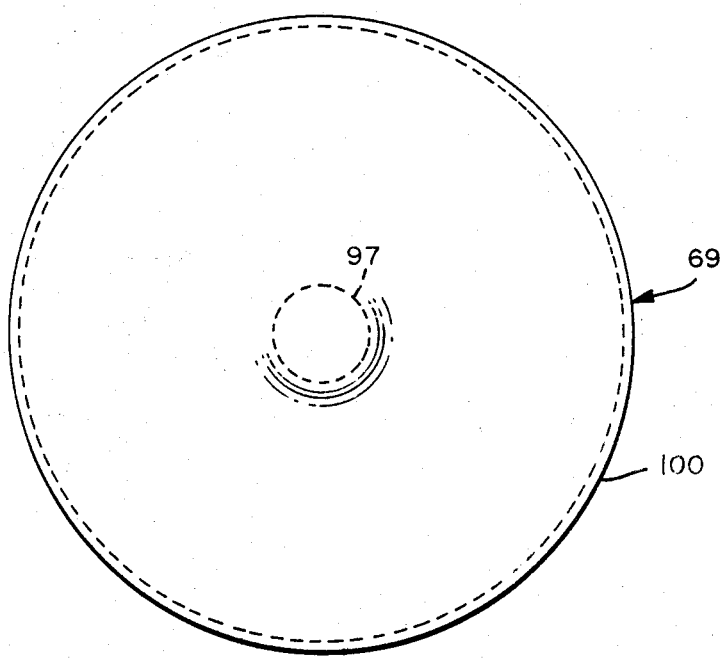
FIG. 6 illustrates a second embodiment of the invention.

Referring now to FIGS. 6 and 7, there is illustrated another embodiment of the invention, one which features cylindrical symmetry. A cylindrical reciprocating generator 69 is illustrated comprising a first ferromagnetic member, in this case the stator 73 having spaced faces 77A and 77B and 81A and 81B which are described in more detail in following.

The stator 73 includes a cylindrical portion 82 and the two annular portions 83 and 84. The annular portions have faces 77A and 77B thereon for reasons which will become apparent in the following. An annular magnet 85 abuts the cylindrical portion of the stator between the annular portions. Abutting the magnet on the opposite side from the cylindrical portion of the stator is the spacer portion 86 of the stator. The spacer portion has faces 81A and 81B thereon which are in opposed spaced apart juxtapositioned relationship to the faces on the annular portions. The separation between the faces on the annular portion of the stator and the faces which front them on the spacer portion of the stator are generally equal. Thus the separation from face 77A to face 81A is generally the same as the separation from face 77B to face 81B.

A second ferromagnetic member comprising an armature 87 is positioned concentrically with the stator 73. The armature includes a cylindrical core portion 88 having two flanges 89 and 90 extending therefrom, flange 89 extending between faces 77A and 81A and flange 90 extending between face 77B and face 81B.

The flange 89 has one surface thereof 91 adapted to contact the face 77A and has another surface thereof 92 adapted to contact the face 81A. Similarly the flange 90 has one surface thereof 93 adapted to contact the face 77B and another surface thereof 94 adapted to contact the face 81B. The armature 87 has at both ends thereof shanks 95A and 95B which pass through non-magnetic bushings 96 to assure that the armature travels in a correct reciprocating linear fashion. The shank 95A has a dome portion 97 accessible as a means to effect relative motion between the stator and the armature.

Attached to the stator 77 adjacent the shank 95B of the armature 87 is a metallic casing 98. A means for biasing the armature against the magnetic force which would tend to hold it in contact with face 77B comprises the spring 99 which communicates at one end thereof with the armature and at the other end thereof with the casing. Completely surrounding the stator, the armature and the casing and encapsulating them is a flexible jacket 100 which serves the same purpose as the flexible jacket discussed with respect to the rocking armature embodiment previously described. The spaces within the cylindrical generator 69 are preferably filled with an inert liquid 101, again for the same reasons that an inert liquid is used in the rocking armature embodiment.

A coil 102 is provided about the armature 87 so that current can be removed therefrom at the contacts 103.

As is apparent from FIG. 7, the gap between surface 92 and face 81A is equal to the gap between surface 93 and face 77B. Thus the flange 89 is alternately contacting south and north polar portions of the stator 73 while the flange 90 is concurrently touching north and south polar portions of the stator.

It will be apparent that with the armature in the position shown in FIG. 7 the flux within the armature 87 is upward through the armature as illustrated by the arrows. When the armature is pushed downwardly to its other magnetically stable position, whereby face 77B is in contact with surface 93 and face 81A is in contact with surface 92, it is equally apparent that the flux through the armature passes downwardly therethrough. Thus flux is reversed within the armature as the armature is forced to travel from one magnetically stable position to the other magnetically stable position.

The motion of the armature 87 can be caused by pressure placed upon the accessible dome portion 97 of the armature. In operation the spring is generally made stronger than the magnetic force holding the armature in the lowermost of its two magnetically stable positions as illustrated in FIG. 7 and will return the armature to the uppermost stable position.

Figure 8:
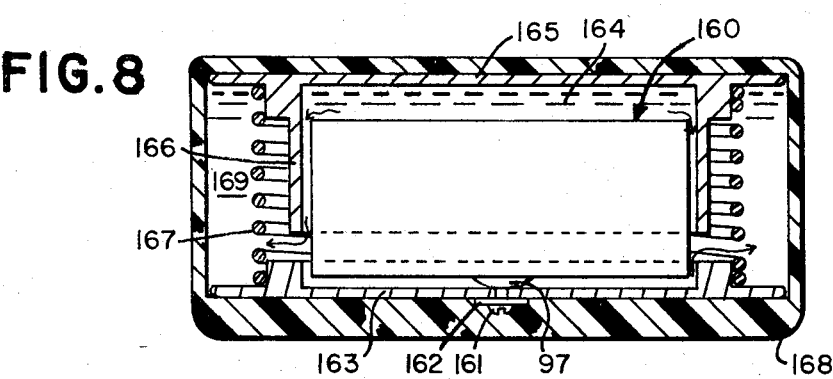
FIGS. 8 and 9 illustrate cross-sectionally an embodiment similar to that illustrated in FIGS. 6 and 7 but including means to adjust to semi-steady applied forces.
Figure 9:
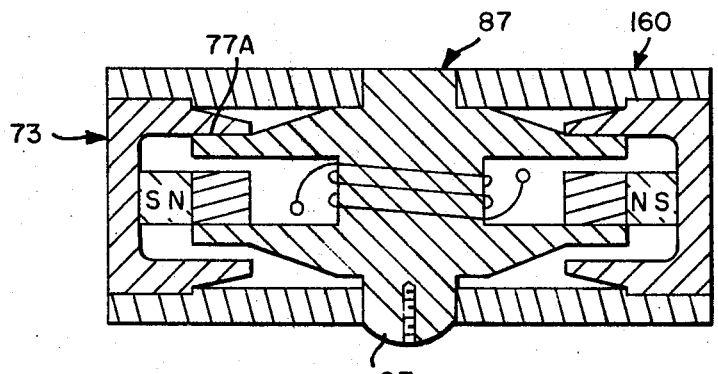

Referring now to FIGS. 8 and 9, there is illustrated another embodiment of the invention, one which features both cylindrical symmetry and the inclusion of self-adjusting means so that the generator may accommodate itself to large semi-steady changes in the forces acting upon it.

FIG. 8 illustrates a cylindrical generator 160 which is substantially the same as the cylindrical generator 69 illustrated in FIG. 7 but without the flexible cover 100, the spring 99 and mechanisms which cooperate with the spring. In the embodiment illustrated in FIG. 8, the armature 87 includes a bolt 161 attached thereto, the bolt 161 in cooperation with the washer 162 holding the disc 163 against the dome portion 97.

The cylindrical electromagnetic generator 160 is held within a cylindrically shaped cavity 164 formed by the plate 165 and the annular ring 166.

The disc 163 and the plate 165 are kept in spaced relationship from one another by the spring 167 which as will be explained later, serves to bias the armature 87 of the generator 160 against staying in its uppermost position, that is, in the position illustrated in FIG. 9. The spring, as is clear from the drawing, serves to push the plate away from the disc and since the armature is held to the disc by the bolt 161, the armature is also pushed away from the disc.

The generator 160 is completely surrounded with a flexible jacket 168 and the voids within the jacket contain an inert viscous liquid such as oil, the viscous liquid having sufficient viscosity so as to resist motion of the generator toward the plate 165 when relatively small fluctuating forces are applied to the flexible jacket adjacent the disc 163. Thus when fluctuating forces are applied to the flexible jacket adjacent the disc, the armature 87 is forced against the biasing of the spring 167 far enough so as to contact the face 77A of the stator 73.

On the other hand, if a large semi-steady force is applied to the flexible jacket adjacent the disc, which might occur if a person in whom the generator was implanted was to lie down, the oil or other inert liquid within the voids enclosed by the flexible jacket 168 would then flow from the cylindrical cavity 164 as indicated by the arrows down around the ring 166 and into the spring chamber 169 which is expandable in size due to the flexible jacket whereby the disc 163 and the plate 165 would come slightly closer together, thereby relieving and cancelling out the effect of the semi-steady force acting upon the flexible jacket whereby fluctuating forces would again cause the armature 87 to intermittently overcome the holding forces of the spring 167 and thereby contact the surfaces 77A of the stator 73.

Another advantage of the structure illustrated in FIGS. 8 and 9 is that it is adjustable for changes in external pressure. For example, if a person having the generator illustrated in FIGS. 8 and 9 was to do scubadiving thereby increasing the external pressure being applied to the jacket 168, the jacket would simply bulge into the chamber 169, thereby relieving the pressure difference.

It is apparent that there are many more linear forces acting within a living body than rotary forces. Thus, a generator which operates on a linear force is most desirable for implantation within a body. Further it is most desirable that a generator be able to generate as much power as possible from the forces acting and for this reason it is highly desirable that reversal of flux through the armature be provided by the linear motion. This is provided in the case of the rocking armature generator 13 wherein the armature 25 rocks back and forth in a substantially linear (although actually arcuate) path and in the cylindrical generator 69 wherein the armature 87 travels in a more exactly linear path.

The provision of encapsulation for the armature is also highly desirable when the armature is to be implanted within the body so as to prevent deterioration thereof. The inclusion of liquid within the armature to balance out pressure forces within and without the armature is also desirable to prevent pressure rupture of the generator. Further, it is apparent that in both the rocking armature generator illustrated in FIGS. 1–5 and in the cylindrical generator illustrated in FIGS. 6 and 9, the armature goes through a very short stroke, namely the distance separating the surfaces 20A – 29 and 20B – 28 in FIG. 2 and/or 81A – 92 and 77B – 93 in FIG. 7, and that the ability to go through this short stroke is provided because there is always a complete ferromagnetic path available to satisfy the magnet or magnets included in the generator.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. A generator adapted for short armature stroke short magnetic flux path operation, comprising:

a stator having opposed spaced apart contact surfaces, said stator including a cylindrical wall and a pair of annular plates one at each end of said wall, said plates having opposed faces thereon comprising said opposed contact surfaces;

means for inducing a magnetic field in said stator substantially completely surrounded thereby generally centrally therewithin, said field inducing means comprising a magnet magnetically coupled to said wall generally centrally between said plates and magnetically coupleable to said other portion of said armature, the poles of said magnet being aligned parallel to said plates;

an armature having one portion thereof adapted to contact one or the other of said opposed contact surfaces and having another portion thereof magnetically coupleable with said stator to present a complete ferromagnetic path therethrough, said other portion thereof being substantially surrounded by said stator;

means for effecting relative motion between said armature and said stator such that said one portion of said armature travels substantially linearly to contact one and then the other of said opposed contact surfaces; and a coil about said armature to extract current therefrom when flux is generated therein;

said armature including a pair of flanges spaced from one another and extending outwards latitudinally therefrom, said flanges each alternately corresponding to said one portion and said other portion thereof as said armature alternately travels from one to another of its two magnetically stable positions, the flux due to said magnet proceeding when said armature is in one of its magnetically stable positions through that part of said wall intermediate said magnet and the one plate serving as said contact surface, through said contact surface serving plate and through that part of the armature intermediate said magnet and the flange contacting said contact surface serving plate, the direction of flux through said armature reversing as the armature alternately contacts each of the pair of plates thereby generating a pulsed current in the coil.

2. A generator as in claim 1, including means for biasing the armature against the magnetic force holding it in contact with one of said faces.

3. A generator as in claim 2 encapsulated in a flexible jacket to protect it from corrosive liquids.

4. A generator as in claim 3, wherein the flexible jacket is liquid filled.

5. A generator adapted for short armature stroke operation, comprising:

a first ferromagnetic member having spaced apart contact surfaces;

a second ferromagnetic member having a portion thereof adapted to contact one or the other of said surfaces and having another portion thereof magnetically coupled with the first member to present a complete ferromagnetic return path therethrough;

means to induce a magnetic field in one of said ferromagnetic members;

means to effect relative motion between the members such that the second member contacts one and then the other of said surfaces;

means magnetically coupled with the other of said members to extract current therefrom when flux is generated in the other of said members due to relative motion between the members such that the second member contacts one and then the other of said surfaces;

a rigid member in spaced relation about said first ferromagnetic member; and means for adjusting the spacing between said first ferromagnetic member and said rigid member responsive to a substantially non-fluctuating force acting on said second ferromagnetic member.

6. A generator as in claim 5, wherein said adjusting means comprises:

a dash pot including a fluid filled bellows with a partition separating the bellows into two portions, the partition having an opening therein through which fluid can flow, said bellows rigidly communicating with said first ferromagnetic member; and means for pivotally holding said rigid member in spaced relation to said first ferromagnetic member whereby when a substantially non-fluctuating force acts on said second ferromagnetic member fluid flow from one portion of the bellows to the other leads to pivoting of said first ferromagnetic member about said pivotal holding means until said second ferromagnetic member is freed from the effect of said substantially nonfluctuating force.

7. A generator as in claim 5 wherein said adjusting means comprises:

a fluid filled flexible jacket communicating with said rigid member and surrounding said first and second ferromagnetic members to define a space therebetween, said rigid member including a partition separating said space into two chambers;

a plate for transmitting force to said motion effecting means communicating with said jacket removed from said rigid member; and means for biasing said partition away from said plate to provide an opening therebetween through which fluid can flow from one of said chambers to the other responsive to application of a substantially nonfluctuating force to one of said plate and said rigid member.

* * * * *